United States Patent
Suzuki et al.

(10) Patent No.: US 6,651,726 B2
(45) Date of Patent: Nov. 25, 2003

(54) METHOD OF ATTACHING MOLD RELEASING AGENT TO MOLDING DIE, MOLDING APPARATUS AND MOLDING DIE

(75) Inventors: Hideyuki Suzuki, Kariya (JP); Koichiro Sato, Kariya (JP); Mitsutoshi Miyazaki, Nagoya (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 09/915,391

(22) Filed: Jul. 27, 2001

(65) Prior Publication Data

US 2002/0011691 A1 Jan. 31, 2002

(30) Foreign Application Priority Data

Jul. 31, 2000 (JP) ........................................ 2000-231822
Jul. 31, 2000 (JP) ........................................ 2000-231823

(51) Int. Cl.⁷ ............................ B22C 3/00; B22D 27/00
(52) U.S. Cl. ......................................... 164/72; 164/267
(58) Field of Search .................................. 164/72, 267

(56) References Cited

U.S. PATENT DOCUMENTS 3,645,319 A * 2/1972 Pondelicek et al. ........... 164/72
3,920,099 A * 11/1975 Pondelicek et al. ........ 184/55.2
3,978,908 A * 9/1976 Klaus et al. ................... 164/72
5,350,006 A * 9/1994 Hanano ....................... 164/267
6,460,596 B1 * 10/2002 Yamaguchi et al. ........... 164/72

FOREIGN PATENT DOCUMENTS

| JP | 62259635 A | * | 11/1987 |
| JP | 04138861 A | * | 5/1992 |
| JP | A-7-214275 | | 8/1995 |
| JP | 07214275 A | * | 8/1995 |

* cited by examiner

Primary Examiner—M. Alexandra Elve
Assistant Examiner—Kim McHenry
(74) Attorney, Agent, or Firm—Posz & Bethards, PLC

(57) ABSTRACT

A method of attaching a mold releasing agent to a molding die, a molding apparatus and a molding die therefor are disclosed. A fixed die (11) of the molding die (1) is connected to the nozzle receiving surface of a molding cavity (10) facing a material supplying nozzle. The mold releasing agent is attached to the material contacting surface (100) of the molding die (1) in such a manner that the fixed die (11) and a movable die (12) are arranged in opposed relation to each other with a gap therebetween less than a distance which allows release of a molded product, and under this condition, the mold releasing agent is supplied to the material contacting surface (100) through the gap between the material supplying nozzle (31) and the nozzle receiving surface (131).

11 Claims, 11 Drawing Sheets

WHEN MOLDING MATERIAL IS SUPPLIED

METHOD OF ATTACHING MOLD RELEASING AGENT TO MOLDING DIE, MOLDING APPARATUS AND MOLDING DIE

BACKGROUND OF THE INVENTION

1. Field of the Invention

The present invention relates to a method of attaching a mold releasing agent to various molding dies and a molding apparatus or, in particular, to a method of attaching a mold releasing agent to various molding dies and a molding die used for molding a magnesium alloy.

2. Description of the Related Art

In molding various molding materials using a molding die, a mold releasing agent is coated, in advance, on the surface of the molding cavity of the molding die, the material supply path for supplying the molten molding material and the surfaces of the molding die contacted by the molding material to thereby facilitate the moval of the molded product after opening the die.

In the prior art, as shown in FIG. 11, with the molding die 9 full open and thus the material contacting surfaces 900 exposed, the mold releasing agent 930 is coated by spraying a stock solution of the mold releasing agent, diluted with water, directly by a spray 93 between a fixed die 91 and a movable die 92.

According to this conventional method, a lubrication film 931 is formed by the mold releasing agent 930 on the material contacting surfaces 900 and the molding die 9 is cooled by the mold releasing agent.

In the case where the molding die 9 is temperature regulated, the molding die 9 is excessively cooled and the temperature restoration time is increased and the run of the molten material is deteriorated, resulting in a deteriorated appearance quality of the molded product and an increased rejection rate of the molded product. This problem becomes conspicuous especially in molding a magnesium alloy having a small heat capacity.

Also, excessive application of thermal stress to the molding die 9 shortens the service life of the molding die 9 due to metal fatigue.

Further, a considerable length of time is required for uniformly spraying the mold releasing agent 930 on the material contacting surfaces 900. In addition, an air blow process is required for drying the residual mold releasing agent 930. The conventional method of spraying the mold releasing agent 930 thus requires a considerable working time, and therefore constitutes a factor causing a lengthened molding cycle time.

Furthermore, the sprayed mold releasing agent 930 is scattered or drips off outside of the molding die 935, thereby adversely affecting the working environment.

Another problem is that, as shown in FIG. 11, the mold releasing agent 930 attaches to the dividing surfaces 901 of the fixed die 91 and the movable die 92 not constituting the material contacting surface 900.

Especially when the mold releasing agent 930 attaches to the dividing surfaces 901, burs or the like, generated at the time of molding, attach to the fixed die 91 and the movable die 92, which are thus improperly closed often causing a molding failure.

SUMMARY OF THE INVENTION

The present invention has been achieved in view of the aforementioned problems of the prior art, and the object thereof is to provide a method of attaching a mold releasing agent to a molding die, a molding apparatus and a molding die which prevent the excessive cooling of the molding die, shorten the molding cycle time and prevent the deterioration of the working environment, while at the same time lengthening the service life of the molding die.

According to one aspect of the invention, there is provided a method of attaching a mold releasing agent to a molding die of a molding apparatus, wherein the molding die includes at least a fixed die and a movable die configured to form a molding cavity when closed, wherein the molding cavity is connected to a nozzle receiving surface facing a material supplying nozzle configured to supply a molding material from the molding apparatus, wherein the mold releasing agent is attached to the material contacting surfaces of the molding die contacted by the molding material at the time of molding the molding material using the molding apparatus, and wherein the fixed die and the movable die are arranged in opposed relation to each other with a gap therebetween less than a gap capable of releasing the molded product, and the mold releasing agent is supplied to the material contacting surfaces through the gap between the material supplying nozzle and the nozzle receiving surface.

What is most noticeable in this aspect of the invention is that the fixed die and the movable die are arranged in opposed relation to each other with a gap therebetween less than a gap capable of releasing the molded product, and the mold releasing agent is supplied through the gap between the material supplying nozzle and the nozzle receiving surface thereby to attach the mold releasing agent to the material contacting surfaces.

The distance capable of releasing the molded product is defined as the narrowest distance allowing removal of the molded product after the molding process, and is uniquely determined for each molding die.

By attaching the mold releasing agent to the fixed die and the movable die arranged in this way, the mold releasing agent can be prevented from attaching to the dividing surfaces of the fixed and movable dies where the mold releasing die is not required, or a lesser amount of the mold releasing agent is attached. Also, the scattering or dripping off of the mold releasing agent outside of the fixed die and the movable die can be prevented or reduced.

According to another aspect of the invention, there is provided a molding apparatus comprising a molding die, wherein the molding die includes at least a fixed die and a movable die configured to form a molding cavity by being closed, and wherein the molding cavity is connected to a nozzle receiving surface facing a material supplying nozzle configured to supply a molding material from the molding apparatus, the apparatus comprising a releasing agent supply path for supplying the mold releasing agent through a gap between the material supplying nozzle and the nozzle receiving surface to the material contacting surfaces of the molding die contacted by the molding material when molding the molding material using the molding apparatus, the mold releasing agent being adapted to attach to the material contacting surfaces.

In the molding apparatus according to this aspect of the invention, the mold releasing agent is supplied along the releasing supply path from the gap between the material supplying nozzle and the nozzle receiving surface and thus can enter the molding cavity.

The material contacting surfaces are those surfaces brought into contact with the molding materials at the time of molding, and are configured of the wall surfaces surrounding the molding cavity. With the apparatus according to this aspect of the invention, therefore, the releasing agent is rarely attached to other than the material contacting surfaces.

The use of the molding apparatus according to this aspect of the invention thus makes it possible to prevent wasteful use of the mold releasing agent on the one hand and to use the stock solution, free of water for diluting the mold releasing agent, on the other. Also, a smaller amount of water is used for diluting the mold releasing agent than in the prior art.

As a result, the temperature drop, which otherwise might be caused, when attaching the mold releasing agent to the molding die, can be prevented and a molding die securing a superior run can be obtained. Also, the improved run can improve the appearance quality and reduce the rejection rate of the molded product.

Also, since an excessive thermal stress on the molding die can be reduced, the service life of the molding die can be lengthened.

Further, with the molding apparatus according to this aspect of the invention, less mold releasing agent is scattered or drips out of the molding die, and therefore the working environment is rarely deteriorated.

As a result, a shorter time is required for attaching the mold releasing agent, and so is the time required for an air blow to dry the molding releasing agent attached. Thus, the molding cycle time can be shortened.

In this aspect of the invention, as described above, a molding apparatus is provided in which the excessive cooling of the molding die is prevented, the molding cycle time is shortened, and the working environment is not deteriorated while at the same time lengthening the service life of the molding die.

According to still another aspect of the invention, there is provided a method of attaching a mold releasing agent to a molding die comprising at least a fixed die and a movable die for molding a magnesium alloy, wherein with the fixed die and the movable die arranged in opposed relation to each other with a space therebetween of less than such a distance as to be capable of releasing the molded product, the mold releasing agent is attached to the material contacting surfaces of the fixed die and the movable die.

According to a further aspect of the invention, there is provided a molding die comprising at least a fixed die and a movable die for molding a magnesium alloy, wherein at least a selected one of the fixed die and the movable die is formed with a releasing agent supply path communicating with the material contacting surfaces of the fixed die and the movable die, the molding die further comprising a support mechanism capable of supporting the fixed die and the movable die with a space therebetween of less than a space capable of releasing the molded product.

The present invention may be more fully understood from the description of preferred embodiments of the invention set forth below, together with the accompanying drawings.

DESCRIPTION OF THE PREFERRED EMBODIMENTS (First Embodiment)

A molding apparatus and a method of attaching a mold releasing agent to a molding die of the molding apparatus according to a first embodiment of the invention will be explained with reference to FIGS. 1 to 3.

Figure 1:
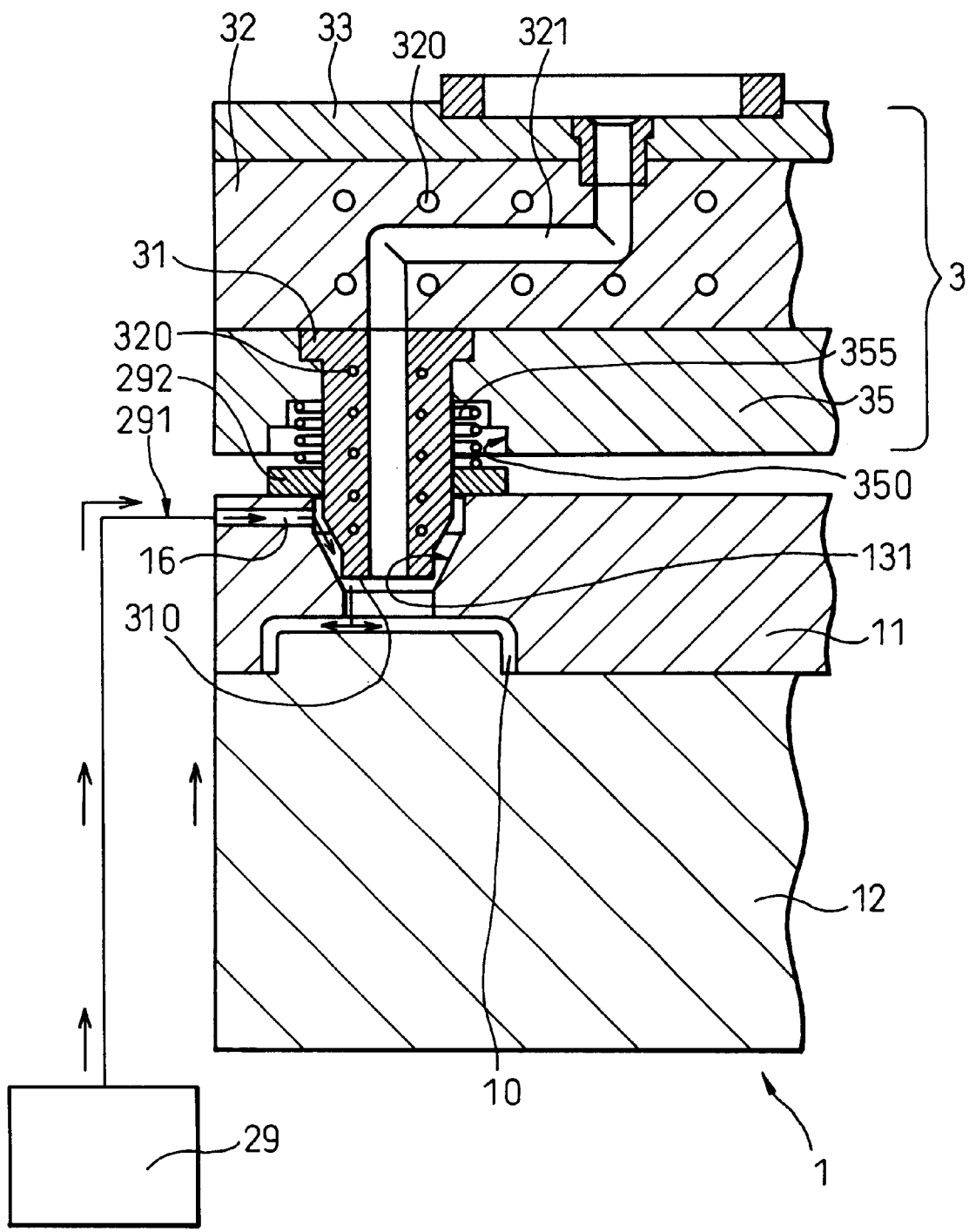
FIG. 1 is a diagram for explaining the essential parts of a molding apparatus in the process of supplying a mold releasing agent according to a first embodiment of the invention.

The molding apparatus according to this embodiment comprises a molding die 1 as shown in FIG. 1.

The molding die 1 includes a fixed die 11 and a movable die 12 configured to form a molding cavity 10 by being closed. The fixed die 11 has a nozzle receiving surface 131 facing a material supplying nozzle 31 configured to supply a molding material from the molding apparatus.

The molding apparatus comprises a releasing agent supply path 16 for supplying the mold releasing agent to the material contacting surfaces 100 of the fixed die 11 and the movable die 12 adapted to contact the molding material, through the space between the material supplying nozzle 31 and the nozzle receiving surface 131, and a support mechanism (not shown) capable of supporting the fixed die 11 and the movable die 12 in opposed relation to each other with a space therebetween less than a space capable of releasing the molded product.

In attaching the mold releasing agent to the material contacting surfaces 100, the fixed die 11 and the movable die 12 are arranged in opposed relation to each other with a space therebetween less than a space capable of releasing the molded product, and under this condition, the mold releasing agent is supplied to the material contacting surfaces 100 through the space between the material supply nozzle 31 and the nozzle receiving surface 131.

A molding die of hot runner type and a molding apparatus according to this embodiment will be specifically explained.

Figure 3:
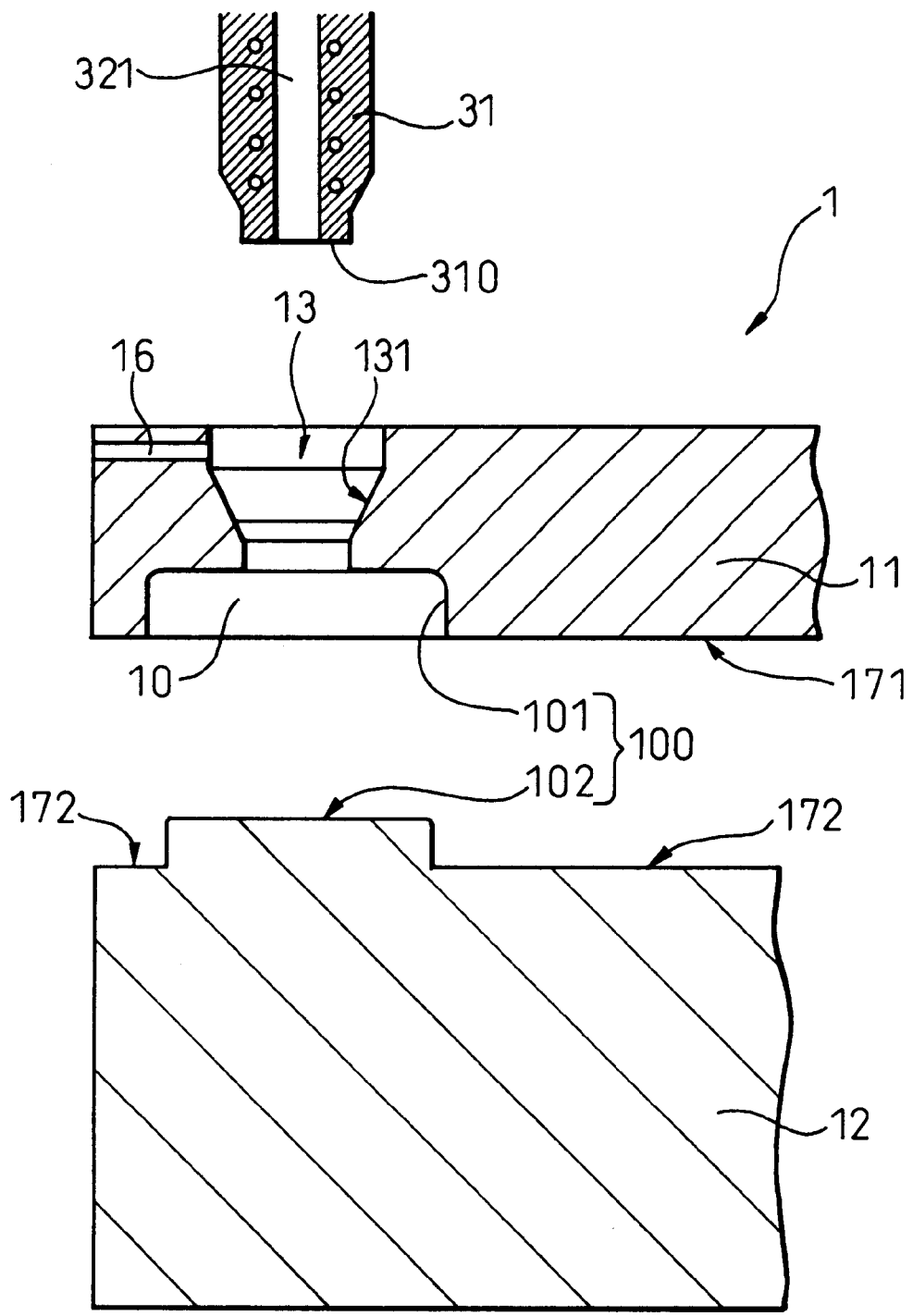
FIG. 3 is a development for explaining the molding die according to the first embodiment.

As shown in FIGS. 1 and 3, the molding die 1 includes a hot runner system 3 in addition to a fixed die 11 and a movable die 12 for forming a molding cavity 10 when closed.

The fixed die 11 has a bowl-shaped nozzle accommodating space 13 communicating with the molding cavity 10 and configured to open to outside of the molding die 1. The whole side surface of the nozzle accommodating space 13 nearer to the molding cavity 10 constitutes the nozzle receiving surface 131.

Also, the fixed die 11 includes a releasing agent supply path 16 communicating with the nozzle accommodating space 13. This releasing agent supply path 16 is configured of a simple through hole.

In this embodiment, reference numerals 171, 172 designate the dividing surfaces on which the fixed die 11 and the movable die 12 come into contact with each other.

Also, the material contacting surfaces 100 of the molding die 1 according to this embodiment include cavity surfaces 101, 102 making up the molding cavity 10. Further, according to this embodiment, the forward end surface 310 of the material supply nozzle 31 also makes up a part of the material contacting surfaces 100.

In this embodiment, as shown in FIG. 1, an injection nozzle 291 and a mold releasing agent tank 29 are arranged outside of the molding die 1 for injecting the mold releasing agent under pressure into the releasing agent supply path 16 formed on the fixed die 11 as shown in FIG. 1.

Also, according to this embodiment, the mold releasing agent is attached to the fixed die 11 and the movable die 12 in closed state as shown in FIG. 1. As a result, the drive mechanism of the molding die 1 is used directly as a support mechanism but is not shown in FIGS. 1 and 2.

Now, the hot runner system 3 according to this embodiment will be explained.

As shown in FIG. 1, the hot runner system 3 includes a fixed die fixing plate 33, a hot runner manifold 32 and a nozzle fixing plate 35 having a material supply path 321 for supplying the molding material from the molding apparatus body not shown.

Heat medium flow paths 320 for insulating the material supply path 321 are arranged in the neighborhood of the material supply path 321 of the hot runner manifold 32.

The nozzle fixing plate 35 includes a material supplying nozzle 31 for ejecting the molding material to the molding cavity 10. The material supplying nozzle 31 also has heat medium flow paths 320. The surface of the nozzle fixing plate 35 in opposed relation to the fixed die 11 is formed with a recess 350 in which an elastic spring 355 is set. Also, a lid 292 is fitted to the material supplying nozzle 31 in such a manner as to contact the elastic spring 355.

An explanation will be given of the process for molding a molded product using the molding die 1 according to this embodiment.

The molding process includes, in time series, the steps of (1) closing the molding die 1, (2) advancing the material supplying nozzle 31, (3) injecting the molten material, (4) completely filling the molding cavity 10, (5) solidifying the molten material, (6) retreating the material supplying nozzle 31, (7) opening the molding die 1, and (8) recovering the molded product.

These steps (1) to (8) make up one molding cycle.

As shown in FIG. 1, the movable die 12 and the fixed die 11 are closed. Then, the material supplying nozzle 31 is inserted into the nozzle accommodating space 13. In the process, care is taken not to close the releasing agent supply path 16 formed in the nozzle accommodating space 13 and to form a gap between the material supplying nozzle 31 and the nozzle receiving surface 131. This insertion causes the lid 292 arranged on the material supplying nozzle 31 to seal the nozzle accommodating space 13.

Under this condition, the mold releasing agent in the mold releasing agent tank 29 is ejected from the ejection nozzle 291 to the releasing agent supply path 16. The mold releasing agent is supplied to the molding cavity 10 through the releasing agent supply path 16 and the gap between the material supplying nozzle 31 and the nozzle receiving surface 131 in the nozzle accommodating space 13.

As the result of this ejection, a lubrication film of the mold releasing agent is formed on the material contacting surfaces 100.

Figure 2:
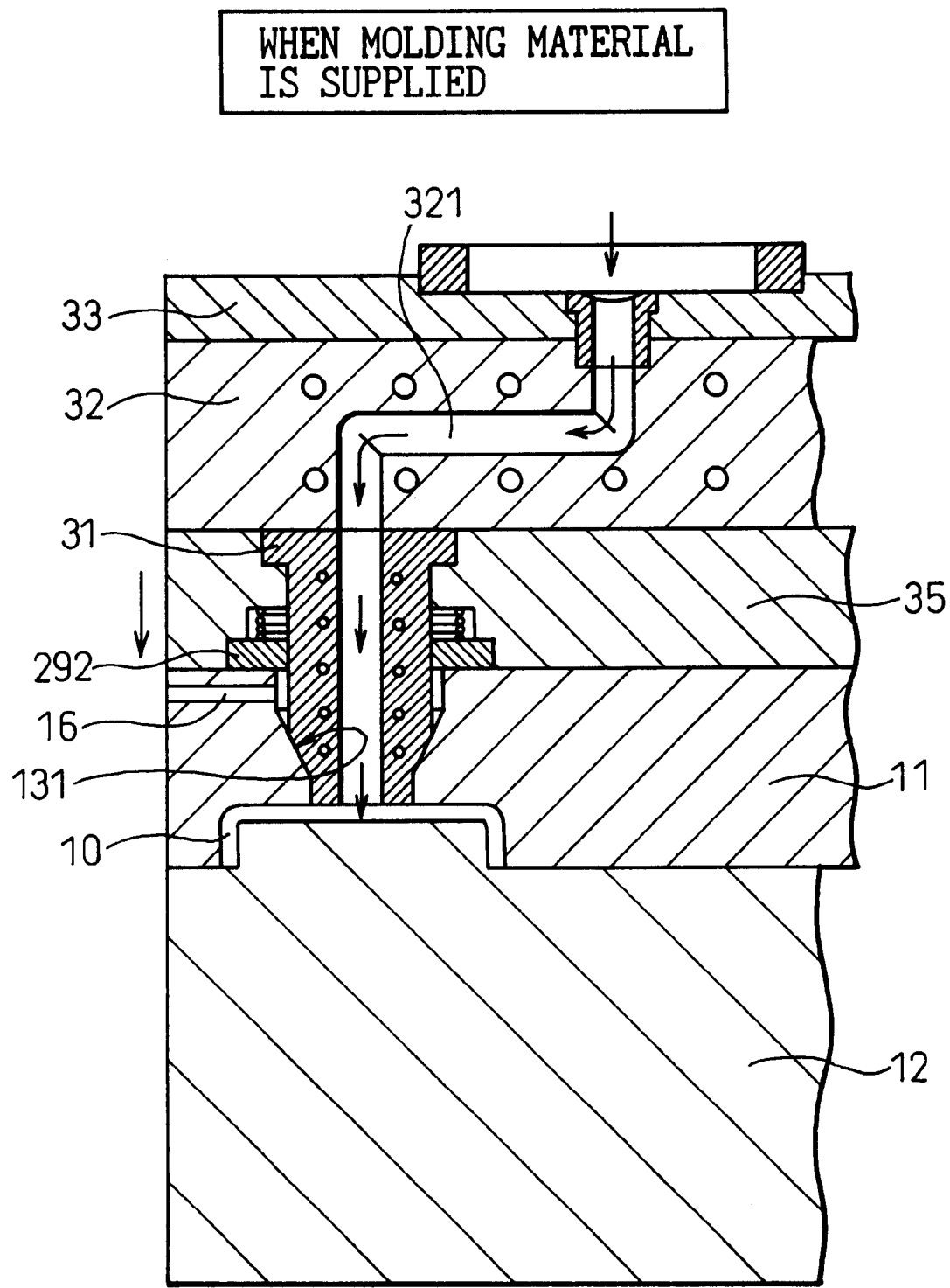
FIG. 2 is a diagram for explaining the essential parts of a molding apparatus in the process of supplying a molding material according to the first embodiment of the invention.

Then, as shown in FIG. 2, the material supply nozzle 31 is advanced to the nozzle receiving surface 131 and the two are brought into contact with each other. At the same time, the elastic spring 355 is compressed while the lid 292 is accommodated in the recess 350 formed in the nozzle fixing plate 35.

As a result, the releasing agent supply path 16 is separated from the molding cavity 10.

Then, the molding material in molten state is injected from the material supply nozzle 31 and the molding cavity 10 is filled with the required amount of the molten material.

After being thus filled, the molding die 1 is cooled to solidify the molten material and the material supplying nozzle 31 is retreated.

The movable die 12 is released from the fixed die 11 by a die drive mechanism thereby to open the die. Then, the molded product is recovered.

After that, as shown in FIG. 1, the die is closed again to start the next molding cycle.

Now, the function and effects of this embodiment will be explained.

According to this embodiment, the fixed die 11 and the movable die 12 are arranged in closed state, and the mold releasing agent is attached to the material contacting surfaces 100 from the releasing agent supply path 16 on the fixed die 11 through the gap between the material supply nozzle 31 and the nozzle receiving surface 131.

As a result, the mold releasing agent can be prevented from attaching to the dividing surfaces 171, 172 of the fixed die 11 and the movable die 12. Also, the mold releasing agent is prevented from scattering outside of the fixed die 11 and the movable die 12.

In this way, the mold releasing agent can be used without waste, and the stock solution itself can be used without water, for diluting the mold releasing agent, or with a lesser amount of the diluting water than in the prior art.

As a consequence, the temperature reduction which otherwise would result from the attachment of the mold releasing agent to the molding die 1 can be prevented, and a superior run can be secured. Also, the improved run can improve the appearance quality and reduce the rejection rate.

Also, the thermal stress of the molding die 1 can be reduced for a longer service life of the molding die.

Further, the scattering or dripping of the mold releasing agent outside of the molding die 1 rarely occurs and so does the deterioration of the working environment. Since the molding die 1 is not wide open when the mold releasing agent is attached, the mold releasing agent is not easily attached to other than the material contacting surfaces 100. Thus, the mold releasing agent is attached completely in a shorter length of time, and a shorter time is required for the air blow to dry the attached mold releasing agent. In this way, the molding cycle time is shortened.

Further, according to this embodiment, the mold releasing agent is supplied by way of the space formed between the material supplying nozzle 31 and the nozzle receiving surface 131. This can be realized by forming a small hole (that is to say, the releasing agent supply path 16) for the mold releasing agent in the fixed die 11, and therefore the path for supplying the mold releasing agent can be secured without any major reconstruction. As a result, the method of attaching the mold releasing agent according to this embodiment can be employed at a lower cost.

Furthermore, when introducing the molten material into the molding cavity 10, the releasing agent supply path 16 can be separated from the molding cavity 10 by advancing the material supplying nozzle 31. Thus, the molten material can be prevented from flowing in the opposite direction, and the need is eliminated of a mechanism for blocking the releasing agent supply path 16, thereby leading to a lower cost.

As described above, this embodiment can provide a method of attaching the mold releasing agent to the molding die in which the molding die is prevented from being excessively cooled, the molding cycle time is shortened, the working environment is prevented from being deteriorated, and the service life of the molding die can be lengthened.

(Second Embodiment)

An explanation will be given of a molding apparatus according to a second embodiment in which a releasing agent supply path is formed on the fixed die fixing plate and the molding apparatus itself.

Figure 4:
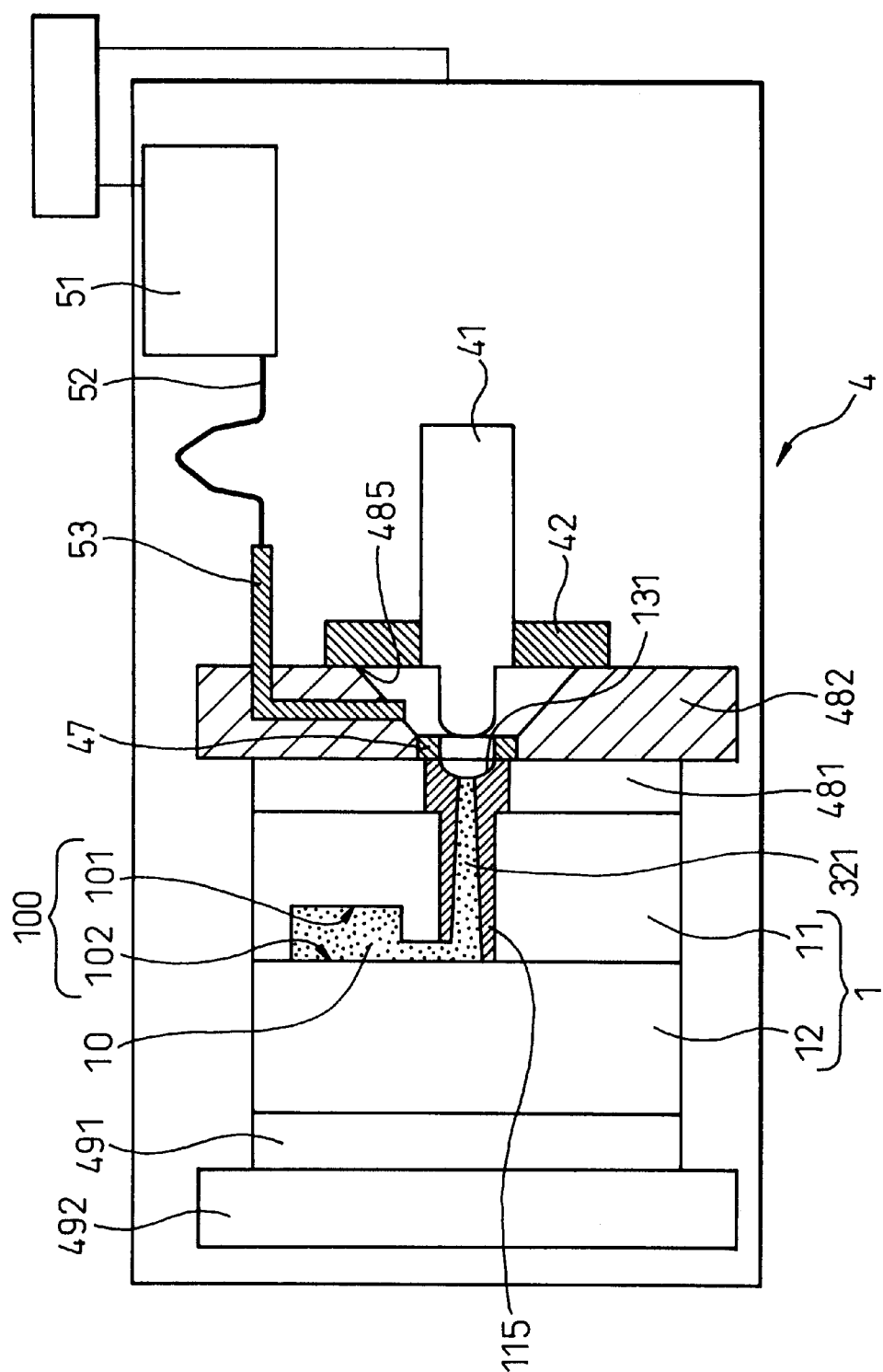
FIG. 4 is a diagram for explaining a molding apparatus comprising a releasing agent supply path on a fixed die fixing plate according to a second embodiment of the invention.

As shown in FIG. 4, the molding apparatus 4 according to this embodiment is used to fabricate a molded product by use of a molding die 1 including a fixed die 11 and a movable die 12.

The movable die 12 is arranged on a movable die fixing plate 492 through a movable mounting plate 491, and is configured in a way adapted to advance and retreat to and from the fixed die 11. The driving mechanism for the movable die 12 is not shown.

The fixed die 11 is formed with a material supply path 321 communicating with the molding cavity 10. The material supply path 321 is formed of a sprue bushing 115 built in the fixed die 11.

The fixed die 11 is arranged on the fixed die fixing plate 482 through the fixed die mounting plate 481.

The sprue bushing 115 is also built in the fixed mounting plate 481. The material supply path 321 of the sprue bushing 115 nearer to the fixed die mounting plate 481 is formed with the nozzle receiving surface 131.

Also, the fixed die fixing plate 482 is formed with such a space 485 for accommodating the nozzle 41 as to communicate with the material supply path 321 through the nozzle receiving surface 131.

Reference numeral 47 designates a locating ring.

A lid 42 is arranged on the outer periphery of the nozzle 41. The nozzle accommodating space 485 is configured to be sealed by insertion of the nozzle 41 into it.

Also, the fixed die 11 and the movable die 12 can be directly mounted on the fixed die fixing plate 482 and the movable die fixing plate 492.

The releasing agent supply path 53 is formed on the fixed die fixing plate 482 in such a manner as to open into the nozzle accommodating space 485. The releasing agent supply path 53 is formed of an ejection nozzle which is connected to a releasing agent tank and a control unit 51 through a pipe 52.

In response to a signal from the control unit 51, a predetermined amount of the mold releasing agent is supplied under a predetermined pressure from the releasing agent tank by way of the ejection nozzle to the nozzle accommodating space 485 through the pipe.

The operation of the molding apparatus 4 according to this embodiment will be explained.

The fixed die 11 and the movable die 12 are closed thereby to form the molding cavity 10.

The nozzle 41 is advanced toward the nozzle accommodating space 485 so that the nozzle accommodating space 485 is sealed with the lid 42.

Under this condition, a command is issued from the control unit. Thus, a predetermined amount of the mold releasing agent is supplied under a predetermined pressure to the material supply path 321 and the molding cavity 10 from the releasing agent tank 51 by way of the ejection nozzle 53 through the pipe 52, the nozzle accommodating space 485 and the gap between the nozzle 41 and the receiving surface 131. As a result, a lubrication film of the mold releasing agent is formed on the material contacting surfaces 100.

After that, the nozzle 41 is advanced further so that the nozzle 41 and the nozzle receiving surface 131 are brought into contact with each other. As a result, the releasing agent supply path 53 is separated from the molding cavity 10 and the material supply path 321. Then, the molding material is ejected and filled in the molding cavity 10 from the nozzle 41.

As the next step, the molding die is cooled, and thus the molding material is solidified. The nozzle 41 is retreated and the molding die 1 is opened to recover the molded product.

Then, as shown in FIG. 4, the die is closed again and the next molding cycle is started.

The other detailed points of operation are similar to the corresponding points of the first embodiment, and the same functions and effects can be obtained by this embodiment as in the first embodiment.

Figure 5:
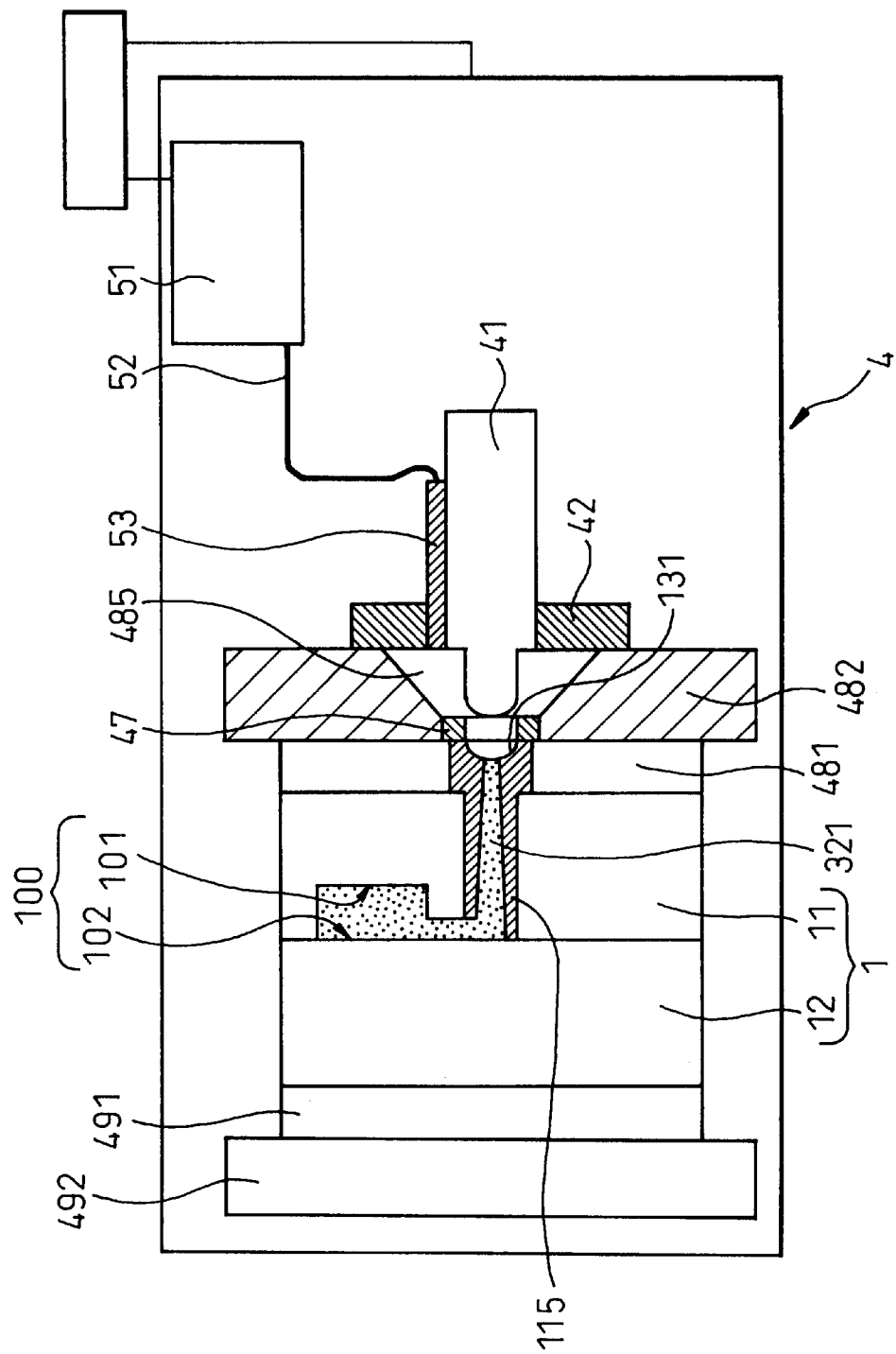
FIG. 5 is a diagram for explaining a molding apparatus having a releasing agent supply path on a nozzle according to the second embodiment of the invention.

Incidentally, the ejection nozzle providing the releasing agent supply path 53 can be formed integrally with the nozzle 41 as shown in FIG. 5.

In such a case, too, the same functions and effects are obtained as in the aforementioned cases.

The method of coating the mold releasing agent to the molding die according to this embodiment of the invention is applicable to the various types of injection molding, die cast molding of a magnesium alloy, a resin, an aluminum alloy, etc. Especially, the method is applicable more suitably to the molding by a hot chamber die-casting machine.

The method according to this embodiment is also applicable to any types of configuration of the molding die. The invention is also applicable to a fixed die or a movable die divided into two or more partial dies.

Also, any type of mold releasing agent can be used in this invention. An oil-based lubricant can be used, for example.

A solvent other than water can also be used for diluting the mold releasing agent.

The material contacting surfaces are those portions brought into contact with the molding material in molten state in the molding process, and include those portions forming the surfaces of the molded product (mainly, the wall surfaces of the molding cavity, the forward end of the material supplying nozzle facing the molding cavity, etc.). A material supply path, if formed on the molding die, is also included.

The molding die such as shown in FIG. 1 may not be provided with the material supply path in the case where the material supply nozzle faces the molding cavity directly. Nevertheless, a material supply path may be formed to make up a path for passing the molten material or the like between the nozzle receiving surface and the molding cavity as shown in FIGS. 4 and 5.

The molten material is in either a fully-molten state or in a semi-molten state.

In a specific method for attaching the mold releasing agent, the mold releasing agent is attached by being sprayed between the material supplying nozzle and the nozzle receiving surface. Such a method is divided into two types, the simple spray and the spray by absorption from outside. The mold releasing agent can also attached simply by absorption from outside.

The nozzle receiving surface can alternatively be formed in the nozzle accommodating space (FIG. 1). In such a case, the molding material is supplied from the material supplying nozzle advanced into the nozzle accommodating space.

Preferably, the mold releasing agent is attached to the material contacting surfaces in such a manner that the material supplying nozzle and the nozzle receiving surface are arranged with a gap formed in-between, the mold releasing agent is supplied, and upon complete attachment of the mold releasing agent, the molding material is supplied into the molding cavity preferably in such a manner that the material supplying nozzle and the nozzle receiving surface are brought into contact with each other thereby to close the gap between them.

As a result, the molding material is prevented from leaking from the gap used for supplying the mold releasing agent or from flowing in the opposite direction at the time of molding.

Further, a special structure for preventing the leakage or the reverse flow of the molding material is not required, resulting in a lower cost.

Preferably, with the fixed die and the movable die closed, the mold releasing agent is attached on the fixed die and the material contacting surfaces.

As a result, the mold releasing agent is positively prevented from being scattered or dripping off outside the molding die, thereby making it possible to prevent the working environment from being deteriorated. Further, the mold releasing agent can be positively prevented from attaching to other than the material contacting surfaces.

Also, the amount of the mold releasing agent used can be minimized.

Further, the molding die described above is a hot runner die, and the material supplying nozzle is applicable as a hot runner nozzle.

The hot runner molding apparatus using the hot runner die and the hot runner nozzle is provided with a mechanism for heating the nozzle whereby the nozzle is kept heated during the molding process. As a result, the hot runner molding using the hot runner die does not solidify the molding material extraneously and can produce a molded product in a shape conforming with the molding cavity.

Preferably, the mold releasing agent is supplied from the releasing agent supply path so formed as to open to the gap between the material supplying nozzle and the nozzle receiving surface.

Thus, the mold releasing agent can be supplied over the entire material contacting surfaces uniformly through the same route as the molding material flows.

The releasing agent supply path can be formed as a through hole in the fixed die or can alternatively be formed in the molding apparatus as in the second embodiment.

The position where the releasing agent supply path is open, is preferably upstream of the position in the flow of the molding material where the material supplying nozzle and the nozzle receiving surface are in contact with each other and the gap therebetween is closed.

As a result, the gap between the material supplying nozzle and the nozzle receiving surface is closed so that the molding material is prevented from leaking from the releasing agent supply path or flowing in a reverse direction. Thus, the need is eliminated to provide the releasing agent supply path with the mechanism for preventing the leakage and a reverse flow of the molding material.

The releasing agent supply path may include an ejector, a spray, an injector or the like connected to a tank filled with a mold releasing agent. As another alternative, the mold releasing agent may be introduced by some means into a simple through hole, a pipe or a tube as a releasing agent supply path.

Furthermore, the molding apparatus preferably comprises a support mechanism by which the fixed die and the movable die can be supported while being arranged in opposed relation to each other with a distance therebetween less than that which allows the molded product to be released.

In this case, the molding apparatus is configured of the support mechanism for keeping the fixed die and the movable die arranged in opposed spaced relationship to each other with a distance therebetween less than that which allows the molded product to be released, and under this condition, the mold releasing agent is attached. Therefore, the mold releasing agent can be prevented from scattering outside of the molding die. Also, since the molding die is not wide open, the mold releasing agent is not easily attached to other than the material contacting surfaces.

As a result, the mold releasing agent can be attached in a shorter length of time and the molding cycle time is shortened.

The support mechanism can double as a molding die drive mechanism used for closing and opening the molding die in the molding process.

Also, the support mechanism and the drive mechanism may be motor driven instead of hydraulically driven.

Further, the fixed die fixing plate configured to mount the fixed die on the molding apparatus is preferably formed with the releasing agent supply path adapted to open to the gap between the material supplying nozzle and the nozzle receiving surface. As a result, the molding cavity and the releasing agent supply path become communicable with each other, so that the mold releasing agent can be supplied from the releasing agent supply path through the nozzle receiving surface into the molding cavity.

As a result, the mold releasing agent can be positively prevented from being easily attached to other than the material contacting surfaces.

Also, since the releasing agent supply path is formed outside of the molding die in this structure, the existing molding die can be used conveniently without any reconstruction.

Further, the releasing agent supply path is preferably formed on the molding apparatus.

The provision of the releasing agent supply path on the molding apparatus makes it possible to use the conventional structure of the molding die as it is.

Furthermore, the fixed die fixing plate of a conventional structure for mounting the fixed die can be used for mounting the fixed die of the molding die on the molding apparatus.

Specifically, the releasing agent supply path can be integrally provided on the material supply nozzle.

(Third Embodiment)

A molding die for a magnesium alloy and a method of attaching the mold releasing agent to the particular molding die according to a third embodiment of the invention will be explained with reference to FIGS. 6 to 10.

Figure 6:
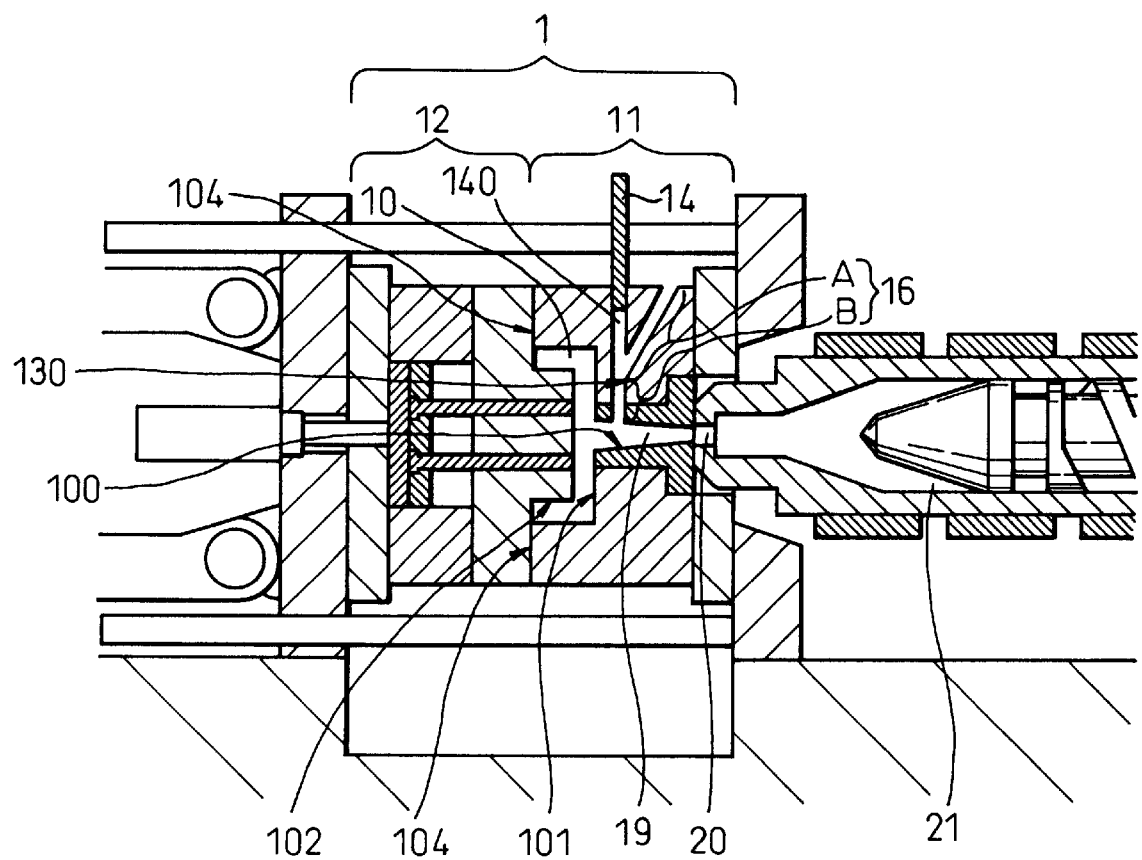
FIG. 6 is a diagram for explaining a molding die according to a third embodiment of the invention.

As shown in FIG. 6, the molding die 1 according to this embodiment is for molding a magnesium alloy and includes a fixed die 11 and a movable die 12. The fixed die 11 is formed with a releasing agent supply path 16 communicating with the material contacting surfaces 100.

Prior to introducing the molten material of a magnesium alloy in this molding die 1, the material contacting surface 101 of the fixed die 11 and the material contacting surface 102 of the movable die 12 are arranged in opposed spaced relationship to each other at a distance less than that allows the molded product to be released. Under this condition, the mold releasing agent is attached to the material contacting surfaces 101, 102. The mold releasing agent is supplied from the releasing agent supply path 16.

Figure 8A:
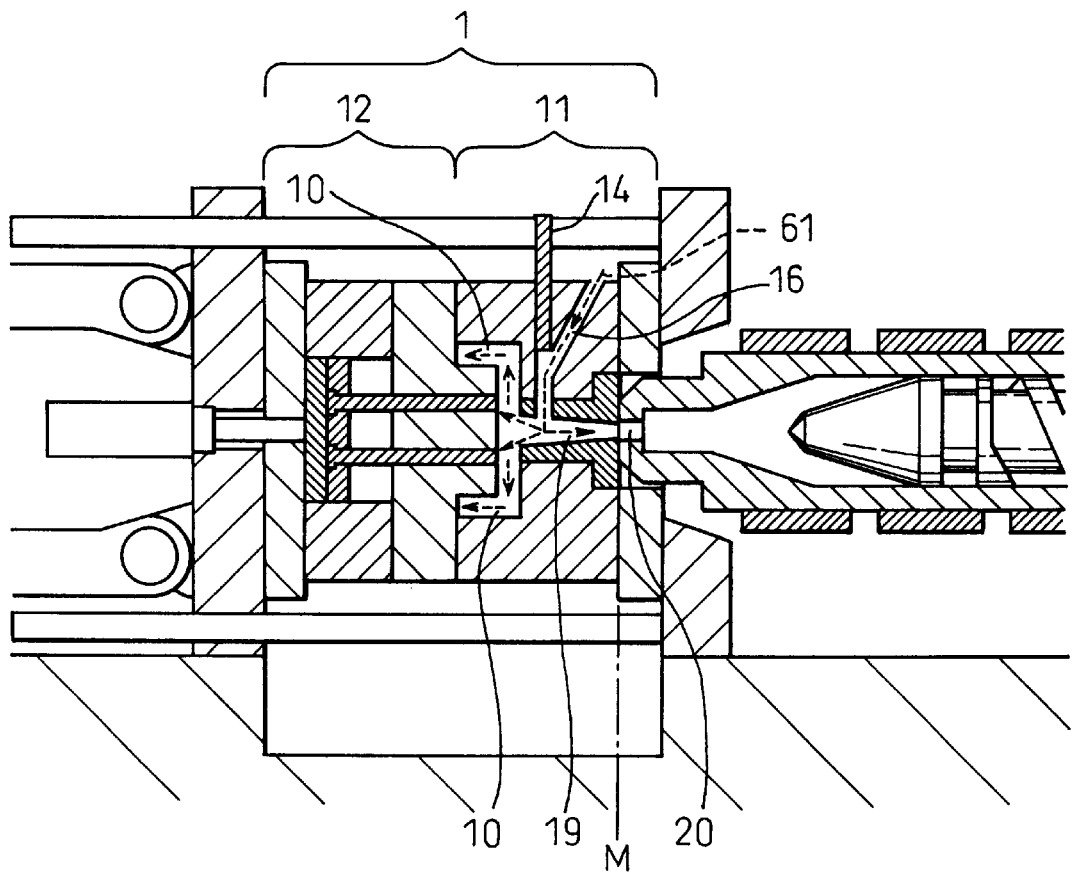
FIG. 8A is a diagram for explaining a mold releasing agent attached to the material contacting surfaces of a molding die in closed state.

By the way, in this embodiment, as shown in FIG. 8A, the mold releasing agent can be attached with the molding die 1 closed.

Now, a detailed explanation will be given.

First, refer to the molding die 1 used in this embodiment. As shown in FIG. 6, the molding die 1 includes the fixed die 11 and the movable die 12, and by closing them, a molding cavity 10 for molding a magnesium alloy is formed. The wall surfaces facing the molding cavity 10, on the other hand, form the material contacting surfaces 101, 102.

In FIG. 6, reference numeral 104 designates dividing surfaces where the fixed die 11 and the movable die 12 are brought into direct contact with each other when the molding die 1 is closed.

Figure 7:
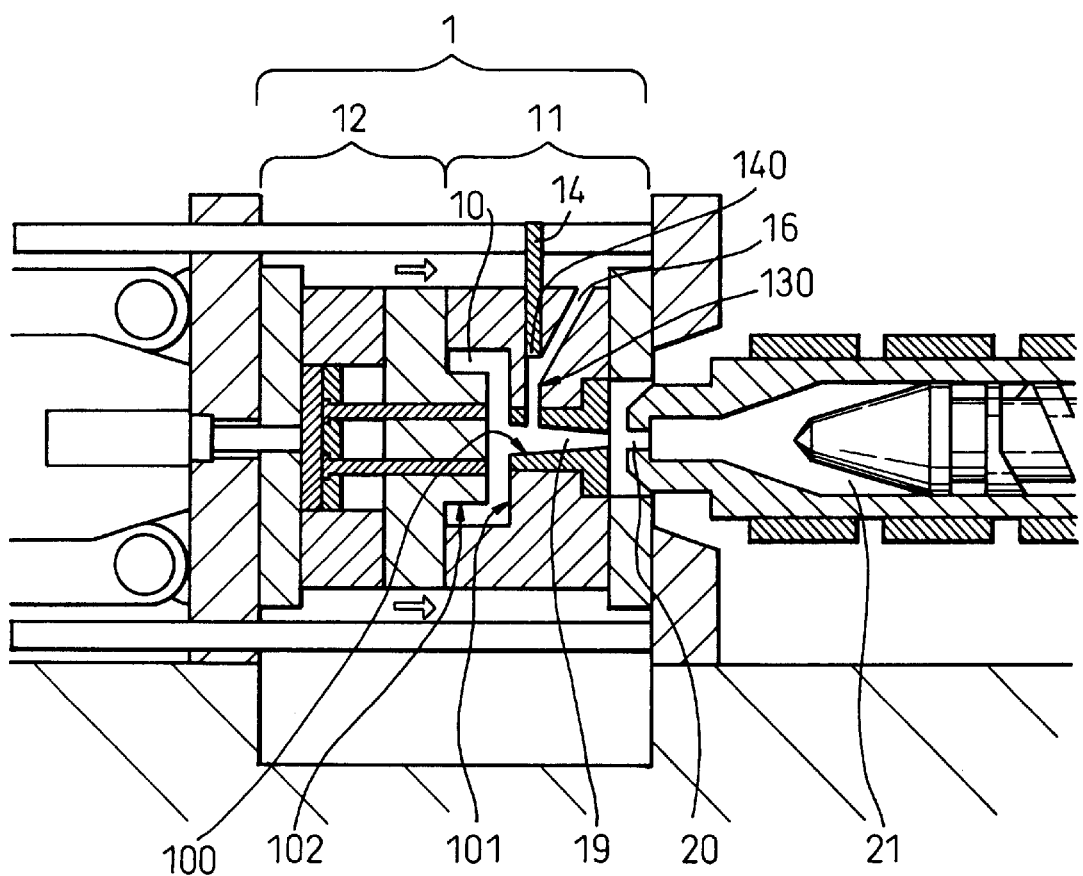
FIG. 7 is a diagram for explaining a molding die in closed state according to a third embodiment of the invention.
Figure 10:
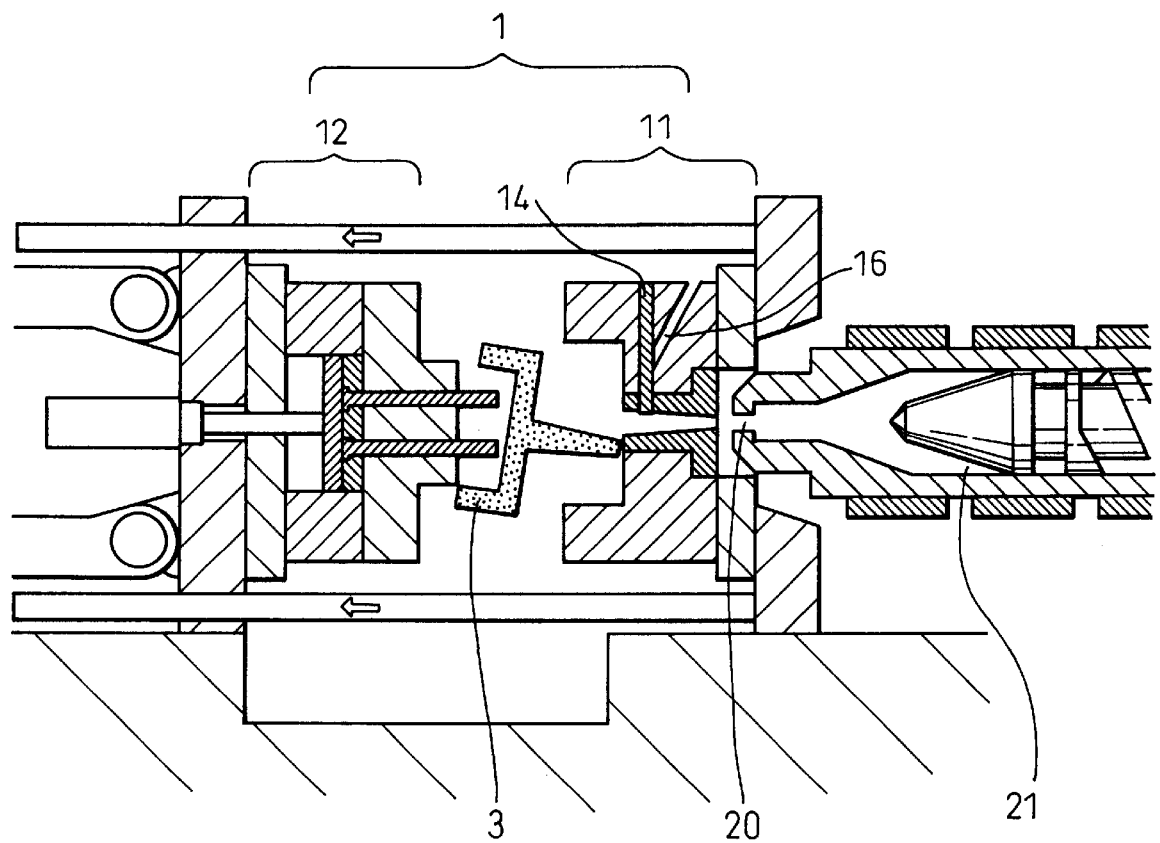
FIG. 10 is a diagram for explaining the manner in which a molded product is recovered by opening the dies according to the third embodiment.

A die drive mechanism, though not shown, is provided for the movable die 12, and drives the movable die 12 toward or away from the fixed die 11 along the direction of arrows shown in FIGS. 7 and 10.

Figure 9:
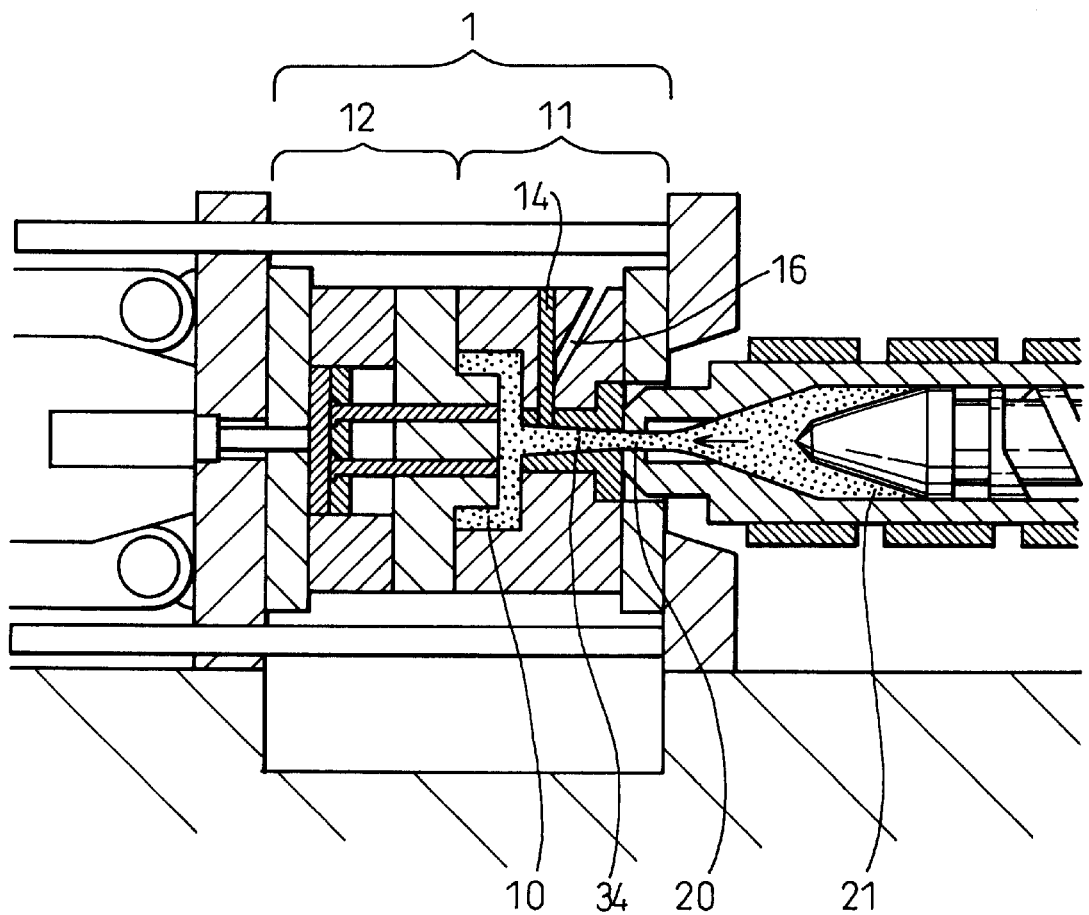
FIG. 9 is a diagram for explaining the state in which the molten material is injected from an injection nozzle into the molding cavity according to the third embodiment of the invention.

The fixed die 11 is formed with the material supply path 19 communicating with the molding cavity 10. The material supply path 19 is connected with an injection cylinder 21 of the injector (not shown) external to the fixed die 11. The injection nozzle 20 is introduced through the injection cylinder 21. The molten magnesium alloy is supplied from the injection nozzle 20 into the molding cavity 10 (FIG. 9).

The wall surface facing the material supply path 19 combines with the wall surface of the molding cavity 10 to form the material contacting surfaces 100.

The material supply path 19 of the fixed die 11 is formed with the releasing agent supply path 16 communicating with the outside of the fixed die 11.

The releasing agent supply path 16 is formed of a portion A extending diagonally in the drawing with respect to the material supply path 19 from the outer wall surface of the fixed die 11 and a portion B extending in the direction perpendicular to the material supply path 19 in the drawing. The boundary between portions A and B forms a bent portion 130.

The bent portion 130 is formed with a blocking pin insertion hole 140 extended from the outer wall surface of the fixed die 11. A blocking pin 14 is inserted in the hole 140 in a manner adapted to move forward and backward (FIGS. 8 to 10).

In the case where the blocking pin 14 advances to a maximum, the forward end of the blocking pin 14 reaches the material contacting surface 100 so that the portion A is blocked and the portion B is closed.

Now, the molding of a magnesium alloy using the molding die 1 described above will be explained.

The process of molding using the molding die 1 according to this embodiment includes, in time series, the steps of (1) closing the molding die 1, (2) advancing the injection nozzle 20, (3) injecting the molten material, (4) filling up the molding cavity 10, (5) solidifying the molten material, (6) retreating the injection nozzle 20, (7) opening the molding die 1, and (8) recovering the molded product 3.

The steps (1) to (8) described above make up one molding cycle.

As shown in FIG. 7, the molding die 1 is closed by bringing the movable die 12 into contact with the fixed die 11.

As the next step, as shown in FIG. 8A, the injection nozzle 20 is advanced to the position M constituting the entrance of the material supply path 19 and the material supply path 19 is sealed.

Figure 8B:
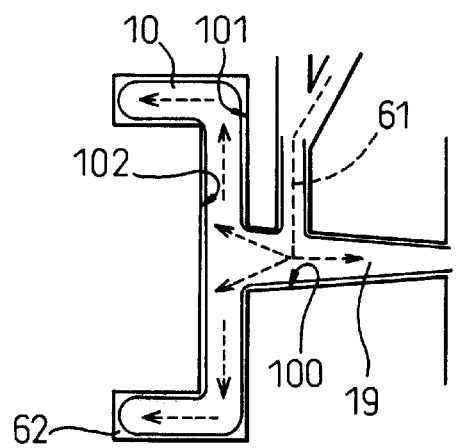
FIG. 8B is a diagram for explaining a lubrication film formed on the material contacting surfaces according to the third embodiment.

Then, a nozzle (not shown) for ejecting the releasing agent is introduced to the releasing agent supply path 16, and the mold releasing agent 61 is ejected onto the material contacting surfaces 101, 102, 100 constituted of the wall surfaces of the molding cavity 10 and the material supply path 19 through the ejection nozzle and the releasing agent supply path 16. As shown in FIG. 8B, this ejection forms a lubrication film 62 of the mold releasing agent 61 on the material contacting surfaces 101, 102, 100.

The mold releasing agent 61 used in this process is an oil-based releasing agent, and is not diluted as a stock solution. Also, the mold releasing agent is ejected under the pressure of 0.4 MPa for five seconds at the rate of 0.5 cc per shot.

Upon complete ejection for a predetermined length of time, the ejection nozzle is retreated outside of the molding die 1 while the blocking pin 14 is advanced to block the portion A, as shown in FIG. 9.

By the way, in order to facilitate the release of the solidified plug at the forward end of the nozzle, a time lag is provided after advancing the injection nozzle 20 to the position M before the actual injection of the molten material. The mold releasing agent 61 is ejected within this time lag.

As the next step, as shown in FIG. 9, the molten magnesium alloy 34 is injected from the injection nozzle 20 and the molding cavity 10 is filled with a required amount of the molten material. After being thus filled, the molding die 1 is cooled to solidify the molten material and the injection nozzle 20 is retreated.

As shown in FIG. 10, the movable die 12 is released from the fixed die 11 by the die drive mechanism thereby to open the molding die, and the molded product 3 of the magnesium alloy is recovered.

After that, as shown in FIG. 7, the molding die is closed again and the next molding cycle is started.

The functions and effects of this embodiment will be explained.

According to this embodiment, the fixed die 11 and the movable die 12 are arranged in closed state, and the mold releasing agent 61 is ejected to the material contacting surfaces 101, 102, 100 formed of the wall surfaces of the molding cavity 10 and the material supply path 19 from the releasing agent supply path 16 formed on the fixed die 11.

The mold releasing agent 61 is sprayed after the molding die is closed. Therefore, the dividing surfaces 104 of the fixed die 11 and the movable die 12 are already in contact with each other, and no mold releasing agent is attached to the dividing surfaces 104. Also, since the molding die is closed, the molding cavity 10 and the material supply path 19 are closed and isolated from external parts. Thus, the mold releasing agent 61 is prevented from attaching to extraneous parts or scattering outside.

As a result, in a method according to this embodiment, the mold releasing agent 61 is not wasted and the stock solution of the mold releasing agent 61 can be used without being diluted with water.

As a result, a temperature drop, which otherwise might be caused by the mold releasing agent attaching to the molding die 1, can be prevented, and a superior run for the magnesium alloy having a small heat capacity can be secured. Also, the improved run improves the appearance quality of the molded product 3 for a reduced rejection rate.

Further, since the mold releasing agent 61 is coated with the molding die closed, the mold releasing agent is rarely scattered or dripped outside of the molding die 1, and also the working environment is hardly deteriorated. Also, in view of the fact that the molding die 1 is not wide open, the mold releasing agent 61 is rarely attached to other than the material contacting surfaces 101, 102, 100.

Thus, the mold releasing agent 61 can be attached and the attached mold releasing agent 31 be dried, in a shorter time.

Furthermore, the step of attaching the mold releasing agent 61 is not provided as an independent step, but is carried out within a time lag after advancing the injection nozzle 20 before the molten material is actually injected. As a result, the molding cycle time can be shortened.

Figure 11:
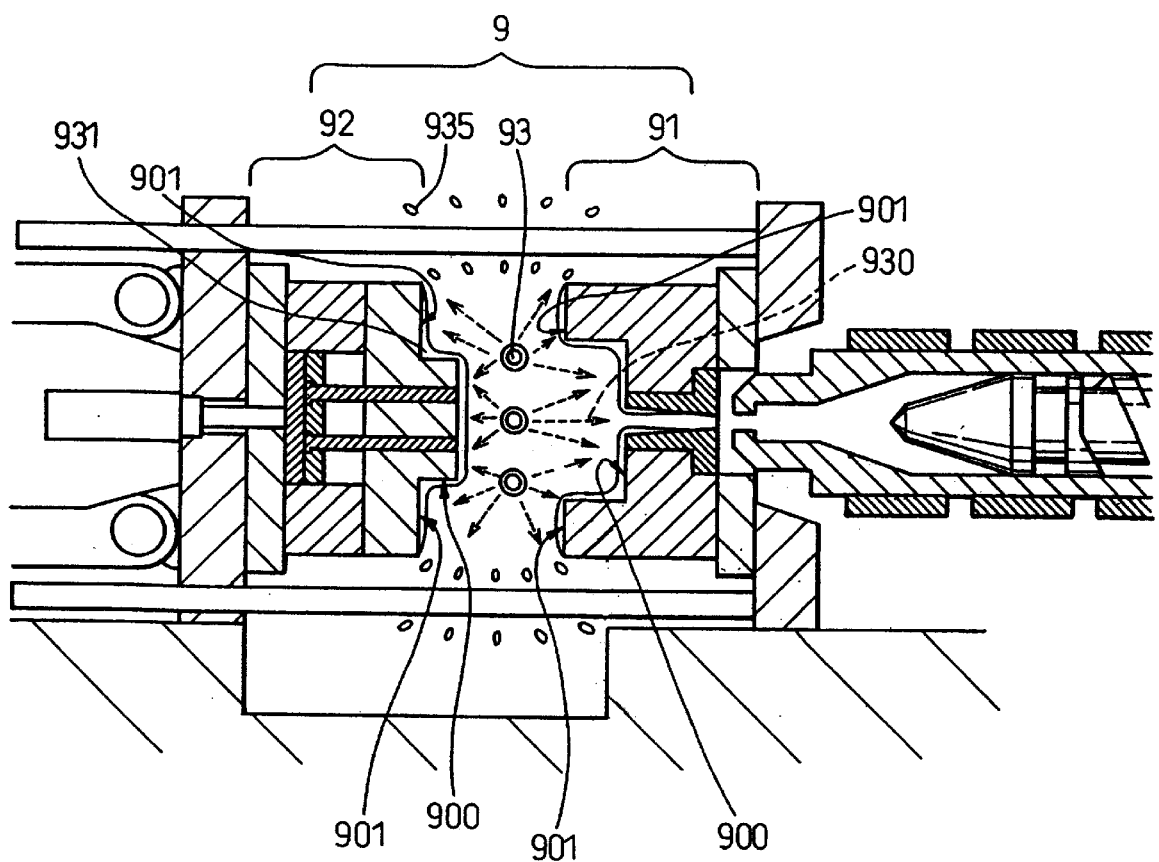
FIG. 11 is a diagram for explaining the manner in which the mold releasing agent is attached by the conventional method.

Conventionally, as shown in FIG. 11, after recovering the molded product by opening the molding die, the molding die 9 is opened wide again. Then, the mold releasing agent 930 is sprayed on the material supply surface 900, after which the molding die is closed again followed by starting the next molding cycle.

The following test was conducted to compare the prior art with the present embodiment.

According to this embodiment, a molding die having a releasing agent supply path is prepared, and a magnesium alloy is molded by the aforementioned method.

According to the conventional method, on the other hand, a magnesium alloy is molded in such a way that the molded product is recovered by opening the molding die without using the releasing agent supply path of the molding die, the mold releasing agent is sprayed, and the molding die is closed.

Consequently, in the method according to this embodiment, one cycle time is 29 seconds. This compares with one cycle time of 44 seconds for the conventional method. The difference of 15 seconds between the present embodiment and the conventional method corresponds to the time required for spraying the mold releasing agent with the molding die wide open.

According to this embodiment, the mold releasing agent is sprayed during the time lag from the advance of the injection nozzle 20 to the injection of the molten material, and therefore no independent step of attaching the mold releasing agent is required.

As described above, according to this embodiment, the cycle time can be considerably shortened thereby making it possible to shorten the time required for the molding process.

According to this embodiment, as described above, there is provided a method of attaching a mold releasing agent to a molding die for a magnesium alloy and a molding die by which the overcooling of the molding die can be prevented, the molding cycle time can be shortened and the deterioration of the working environment can be prevented.

By the way, unlike the present embodiment in which the mold releasing agent is attached after the molding die is closed up, the mold releasing agent may alternatively be attached with the molding die slightly open or the mold releasing agent can be ejected by way of the gap between the movable die and the fixed die.

The third embodiment of the invention is applicable to various molding dies for molding a magnesium alloy. A molding die used for thixotropic magnesium molding and a molding die used for the magnesium die cast molding are examples.

Also, any type of configuration of the molding die can be used. Unlike in this embodiment referring to the molding die configured of one movable die and one fixed die, a molding die comprised of two or more partial dies is also applicable and is included in the present invention.

Further, the present invention is applicable to any type of mold releasing agent. For example, an oil based lubricant may be used as a mold releasing agent.

Furthermore, a solvent other than water can be used for diluting the mold releasing agent.

The material contacting surfaces are those portions with which the magnesium alloy in molten state comes into contact in the molding process. The material contacting surfaces include a material supply path for introducing the molten material or the like as well as the portions for forming the surfaces of the molded product.

Also, the molten material may be in either a fully molten state or in a half-molten state.

A specific method of attaching the mold releasing agent is by spraying it. This spray method includes a simple spray and the spray with absorption from an external source. A method of attaching the mold releasing agent by absorption alone is also available.

In the case where a nozzle or the like is used for spraying the mold releasing agent, the nozzle is preferably located in opposed relation to the material contacting surfaces of the fixed die and the movable die of the molding die.

According to the third embodiment of the invention, the mold releasing agent is preferably attached to the material contacting surfaces of the fixed die and the movable die in closed state.

As a result, the mold releasing agent is positively prevented from scattering or dripping outside of the molding die thereby to prevent the working environment from being deteriorated. Further, the mold releasing agent is prevented from attaching to other than the material contacting surfaces.

Also, the amount of the mold releasing agent consumed in the molding process can be minimized.

Further, at least one of the fixed die and the movable die is preferably formed with a releasing agent supply path communicating with the material contacting surfaces to supply the mold releasing agent from the releasing agent supply path to the material contacting surfaces.

As a result, the mold releasing agent is prevented positively from scattering or dripping outside of the molding die thereby to prevent the deterioration of the working environment. Furthermore, the mold releasing agent can be positively prevented from attaching to other than the material contacting surfaces. Also, the amount of the mold releasing agent consumed can be minimized.

A blocking mechanism is preferably formed on the releasing agent supply path. Preferably, this blocking mechanism is opened to supply the mold releasing agent from the aforementioned supply port, while the blocking mechanism is closed to mold the magnesium alloy.

Thus, the magnesium alloy in molten state can be prevented from intruding into the release agent supply path during the molding process.

A valve, a shutter or the like can be used as the blocking mechanism. A blocking pin can is another possibility.

The support mechanism may double as a drive mechanism for the molding die used for closing and opening the molding die during the molding process.

The support mechanism and the drive mechanism can be driven either hydraulically or by electric motor.

Further, the releasing agent supply path is preferably formed with a blocking mechanism adapted to open when supplying the mold releasing agent to the material contacting surfaces and adapted to be closed when molding a magnesium alloy.

In supplying the molten material to the molding die for molding a magnesium alloy, the blocking mechanism can prevent the molten material from entering the releasing agent supply path.

The blocking mechanism is a valve, a shutter, etc. As another alternative, as shown in the third embodiment, a blocking pin inserted into the releasing agent supply path, in a manner adapted to be advanced or retreated, may be used.

While the invention has been described by reference to specific embodiments chosen for purposes of illustration, it should be apparent that numerous modifications could be made thereto by those skilled in the art without departing from the basic concept and scope of the invention.

What is claimed is:

1. A method of attaching a mold releasing agent to a molding die of a molding apparatus,
   wherein said molding die includes at least a fixed die and a movable die configured to form a molding cavity by being closed,
   wherein the molding cavity is connected to a nozzle receiving surface facing a material supplying nozzle configured to supply a molding material from the molding apparatus,
   wherein the mold releasing agent is attached to the material contacting surfaces of the molding die contacted by the molding material at the time of molding the molding material using the molding apparatus, and
   wherein the fixed die and the movable die are arranged in opposed relation to each other with a gap therebetween, wherein the size of the gap is less than a distance that allows release of the molded product, and under this condition, the mold releasing agent is supplied to the material contacting surfaces through a gap between the material supplying nozzle and the nozzle receiving surface.

2. A method of attaching a mold releasing agent to the molding die according to claim 1,
   wherein said mold releasing agent is attached to said material contacting surfaces in such a manner that said material supplying nozzle and said nozzle receiving surface are arranged with the gap formed therebetween, said mold releasing agent is supplied, and
   upon complete attachment of said mold releasing agent, said molding material is supplied to said molding cavity in such a manner that said material supplying nozzle and said nozzle receiving surface are brought into contact with each other, and the gap between said material supplying nozzle and said nozzle receiving surface is closed.

3. A method of attaching a mold releasing agent to the molding die according to claim 1,
   wherein said fixed die and said movable die are closed, and under this condition, the mold releasing agent is attached to said material contacting surfaces.

4. A method of attaching a mold releasing agent to the molding die according to claim 1,
   wherein said molding die is a hot runner die, and said material supplying nozzle is a hot runner nozzle.

5. A method of attaching a mold releasing agent to the molding die according to claim 1,
   wherein said mold releasing agent is supplied from a releasing agent supply path formed to open to the gap between said material supplying nozzle and said nozzle receiving surface.

6. A molding apparatus comprising a molding die,
   wherein the molding die includes at least a fixed die and a movable die configured to form a molding cavity by being closed, and
   wherein the molding cavity is connected to a nozzle receiving surface facing a material supplying nozzle configured to supply a molding material from the molding apparatus,
   the apparatus comprising a releasing agent supply path for supplying a mold releasing agent through a gap between the material supplying nozzle and the nozzle receiving surface to the material contacting surfaces of the molding die contacted by the molding material when molding the molding material using the molding apparatus, the mold releasing agent being adapted to attach to the material contacting surfaces.

7. A molding apparatus according to claim 6, further comprising a support mechanism capable of supporting said fixed die and said movable die in opposed relation to each other with the gap therebetween, wherein the size of the gap is less than a distance that allows release of the molded product.

8. A molding apparatus according to claim 6, further comprising a releasing agent supply path formed on a fixed die fixing plate configured to mount said fixed die on said molding apparatus, said releasing supply path opening to the gap between said material supplying nozzle and said nozzle receiving surface.

9. A molding apparatus according to claim 6, further comprising said releasing agent supplying path.

10. A method of attaching a mold releasing agent to a molding die including at least a fixed die and a movable die for molding a magnesium alloy, wherein said fixed die and said movable die are arranged in opposed relation to each other with a gap therebetween, wherein the size of the gay is less than a distance that allows release of a molded product, and under this condition, the mold releasing agent is supplied to material contacting surfaces of said fixed die and said movable die, and wherein said releasing agent supply path has a blocking mechanism adapted to open for supplying said mold releasing agent from said releasing agent supply path and adapted to be closed for molding a magnesium alloy.

11. A molding die comprising at least a fixed die and a movable die for molding a magnesium alloy, wherein at least a selected one of said fixed die and said movable die is formed with a releasing agent supply path communicating with material contacting surfaces of the fixed die and the movable die, the molding die further comprising a support mechanism capable of supporting the fixed die and the movable die with a gap therebetween, wherein the size of the gap is less than a distance that allows release of the molded product, and wherein said releasing agent supply path has a blocking mechanism adapted to open for supplying said mold releasing agent to said material contacting surfaces and adapted to be closed for molding a magnesium alloy.

* * * * *